United States Patent

Bonsall, III

Patent Number: 5,968,602
Date of Patent: Oct. 19, 1999

[54] CEMENT-FREE REFRACTORY CASTABLE SYSTEM FOR WET PROCESS PUMPING/SPRAYING

[75] Inventor: Samuel B. Bonsall, III, State College, Pa.

[73] Assignee: North American Refractories Co., Cleveland, Ohio

[21] Appl. No.: 08/910,737

[22] Filed: Aug. 13, 1997

[51] Int. Cl.⁶ ................................ B05D 1/02; B05D 1/34
[52] U.S. Cl. ........................ 427/427; 427/421; 427/426
[58] Field of Search .................................. 427/421, 426, 427/427, 201; 106/692; 264/30

[56] References Cited

U.S. PATENT DOCUMENTS

| | | | |
|---|---|---|---|
| 3,634,112 | 1/1972 | Yavorsky et al. | 106/55 |
| 4,461,789 | 7/1984 | Takashima | 427/426 |
| 4,683,151 | 7/1987 | Hamaguchi et al. | 427/397.8 |
| 4,751,204 | 6/1988 | Kyoden et al. | 501/89 |
| 4,981,731 | 1/1991 | Yorita et al. | 427/426 |
| 5,512,316 | 4/1996 | Dody et al. | 427/140 |
| 5,512,325 | 4/1996 | Langenohl et al. | 427/421 |
| 5,549,745 | 8/1996 | Langenohl et al. | 106/692 |
| 5,628,940 | 5/1997 | Allison | 264/30 |

*Primary Examiner*—Shrive Beck
*Assistant Examiner*—Michael Barr
*Attorney, Agent, or Firm*—Mark Kusner

[57] ABSTRACT

A method of applying a cement-free refractory castable to the surface of a refractory structure, comprising the steps of:

a) preparing an intimately mixed refractory castable having alumina aggregate and a cement-free binder comprised of hydratable alumina;

b) conveying the refractory castable under pressure through a delivery hose to a dispensing nozzle for applying the refractory castable; and, c) adding a salt solution to the refractory castable prior to application by the nozzle at a rate wherein the salt solution comprises about 0.2% to 0.9% by weight of the refractory castable applied by the dispensing nozzle.

8 Claims, No Drawings

CEMENT-FREE REFRACTORY CASTABLE SYSTEM FOR WET PROCESS PUMPING/SPRAYING

FIELD OF THE INVENTION

The present invention relates generally to shotcreting installations and processes, and more particularly, to a cement-free refractory castable wet process shotcreting system.

BACKGROUND OF THE INVENTION

Refractory shotcreting has become a major process for the repair and maintenance of refractory linings in steel, non-ferrous metal, chemical, mineral and ceramic processing plants.

In recent years, cement-free refractory castables suitable for use in high temperature applications and having excellent resistance to corrosion by steel making slags have been developed. These refractories typically utilize a hydratable alumina binder in place of calcium aluminate cement. Because of the suitability of these refractory castables for high-temperature applications in the steel-making industry, it is highly desirable to be able to apply this material by a wet-mix shotcreting process.

Shotcreting is usually classified according to the process used, i.e., wet-mix or dry-mix spraying. A wet-mix refractory shotcrete process generally consists of thoroughly mixing a refractory material and water to produce a pumpable mixture, then introducing the mixture into a delivery hose and pumping the mixture to a dispensing (i.e., spraying) nozzle. A dry-mix refractory shotcrete process generally consists of conveying a dry refractory mixture through the delivery hose by compressed air, then introducing water under pressure at the nozzle prior to application of the refractory to the target surface. In both processes, a set modifying admixture may typically be added to the refractory castable at the nozzle to initiate and accelerate the thickening and setting of the refractory castable so that it will not slump or sag when applied to vertical or overhead surfaces. Since the mixture must be fluid for pumping in the wet-mix process, such admixtures are more critical in the wet-mix compared to the dry-mix process.

Heretofore, refractory shotcreting has found limited application in high temperature and severe corrosive applications, such as for example, in the steel making industry where the refractory material may be exposed to temperatures in the range of 2700° F. to 2900° F. and come in contact with corrosive slag materials. A main reason that shotcreting of refractories is limited in such applications is due to the materials added to the refractory compositions in order to facilitate their application by a wet-mix or a dry-mix shotcreting process. In both processes, a refractory castable mix is used as the base refractory composition. Most dry-process gun mixes are based on castable mixes that are modified to have finer (i.e., smaller) aggregate (than the castables) to reduce "rebound" when the refractory is applied to a surface. In addition, additives, usually clay, are added to the refractory to enhance the sticking (i.e., non-slumping) characteristic of the material when applied to vertical walls. These modifications make dry gunning mixes less applicable to severe high temperature, corrosive applications as compared to castables of similar base composition because the clay adds considerable silica to the refractory. The addition of the silica to very pure alumina systems may have a detrimental effect particularly on the hot modulus of rupture (MOR) of the material, in high temperature shrinkage and resistance to corrosion by steel making slags. In this respect, such gunning mixes may have lower strength at steel making temperatures in the range of 2700° F. to 3000° F. and exhibit a permanent linear change (i.e., shrinkage) at certain temperatures, i.e., above 2700° F. In addition, such gun mixes typically have high porosity, which is related to the clay addition, altered grain sizing and incomplete mixing inherent in a dry gunning process. As a result, such gun mixes are less than desirable in repairing steel ladle linings or other surfaces where such linings would be exposed to extremely high temperatures, i.e., above 2700° F., and to highly corrosive slags.

A wet-mix shotcreting process overcomes the less than desirable mixing inherent in a dry-gunning process and does not generally require the addition of clay to the base refractory castable composition used. Accordingly, a refractory castable suitable for high temperatures and corrosive use may find advantageous application in a wet-mix process, but only if a suitable "accelerator" can be found for use therewith. In this respect, to facilitate the wet-mix process, a set modifying admixture, conventionally referred to as an "accelerator" must be added to the wet-mix refractory just prior to spraying to accelerate the thickening and setting of the refractory castable in order to prevent slumping and sagging of the refractory when it is applied to a vertical surface. It is known that many accelerators have a negative effect on the properties of certain refractories that are typically used for high temperature, highly corrosive environments. For example, sodium silicate is a well-known accelerator used in wet-mix and dry-mix refractory shotcreting. However, even small additions of alkalis, such as sodium, can reduce high temperature strength and refractoriness in high alumina, low cement refractories. It is, therefore, important that an accelerant (i.e., the "accelerator") used with a particular refractory castable be able to provide the thickening and setting characteristics to the particular refractory castable without adversely affecting the properties of the castable by introducing deleterious material into the castable.

The present invention provides a wet-mix shotcreting process for applying a cement-free refractory material of the type described above for use in high temperature applications.

SUMMARY OF THE INVENTION

In accordance with the present invention, there is provided a method of applying a cement-free refractory castable to the surface of a refractory structure, comprising the steps of:

a) preparing an intimately mixed refractory castable having alumina aggregate and a cement-free binder comprised of hydratable alumina;

b) conveying the refractory castable under pressure through a delivery hose to a dispensing nozzle for applying said refractory castable; and, c) adding an acid or salt solution, wherein said solution is comprised of a salt selected from the group consisting of soluble magnesium, and aluminum salts, acid and acid salts, to the refractory castable prior to application by the nozzle at a rate wherein said salt solution comprises about 0.2% to 0.9% by weight of the refractory castable applied by the dispensing nozzle.

In accordance with another aspect of the present invention, there is provided a method of applying a refractory castable to the surface of a structure, comprising the steps of:

thoroughly mixing a refractory material comprised primarily of alumina aggregate, thermally reactive calcined alumina, magnesium oxide and a hydratable alumina cement;

conveying the refractory material under pressure through a delivery hose to a dispensing nozzle for applying the refractory material; and adding a salt solution to the refractory material prior to application by the nozzle at a rate wherein said salt solution comprises less than about 0.70% by weight of the refractory material applied by the dispensing nozzle, the refractory material having a slag corrosion resistance nearly the same as a cast-vibrated refractory of similar composition, and only slightly lower hot modulus of rupture at use temperatures above 2500° F.

It is an object of the present invention to provide a wet-mix process for applying a refractory castable material.

Another object of the present invention is to provide a process as described above for use with cement-free refractory material.

Another object of the present invention is to provide a process as described above for applying refractory material for use in high temperature applications.

A still further object of the present invention is to provide a process as described above wherein a cement-free refractory castable may be shotcreted and wherein the physical properties of the shotcreted refractory closely approach the properties of a castvibrated refractory.

A still further object of the present invention is to provide an accelerator for a wet-mix shotcreting process for applying a cement-free refractory castable wherein the accelerator has minimal impact on the physical properties of the pumped and sprayed mix, and the final cured refractory castable material.

These and other objects and advantages will become apparent from the following description of a preferred embodiment of the invention.

DETAILED DESCRIPTION OF PREFERRED EMBODIMENT

The present invention relates to a refractory system for high-temperature applications and a method of applying such system by a wet-mix shotcreting process. Specifically, the present invention relates to a wet-mix shotcreting process for applying a cement-free refractory castable. In accordance with the present invention, there is provided a high alumina content refractory system having a hydratable alumina binder and a set modifying admixture for use with such refractory in a wet-mix shotcreting process.

According to the present invention, the refractory mix is preferably comprised of approximately 80% to 86% aggregate, 6% to 11% fines and 4% to 8% hydratable alumina binder. The refractory material may also include small amounts of a dispersant to aid mixing of the refractory material and a small amount of fiber additives to create fine channels within the refractory to allow steam to escape during initial heating of the castable. With respect to the aggregate, such aggregate may be alumina or bauxite and preferably has a particle size less than 3-mesh and wherein at about 60% of the aggregate has a particle size of 14-mesh or less.

In accordance with the present invention, a set modifying admixture component is utilized in the wet-mix shotcreting process to provide stickiness and non-slumping characteristics to the refractory. Important to the present invention is that the accelerator contains no silica or CaO, and preferably no alkalis, such as $Na_2O$. According to the present invention, set modifying admixtures comprised of a solution comprised of soluble alumina or magnesium salts, such as aluminum chloride hydrate ($AlCl_3 * 6H_2O$), aluminum ammonium sulfate, aluminum ammonium chloride, magnesium phosphate and magnesium gluconate, solutions of magnesium salts, e.g., magnesium chloride hydrate ($MgCl_2 * 6H_2O$), and magnesium sulfate ($MgSO_4$). Phosphoric acid was found to be an effective accelerator, and therefore, other acids are also expected to provide suitable accelerated hardening of cement-free refractories. The level of admixture added to a refractory is expected to range between 0.2% and 0.9% depending upon the accelerator used. A 0.5% accelerator addition by weight to the castable is preferred.

Effective accelerators for refractories using cement-free hydratable alumina binders include soluble magnesium or aluminum salts. Examples include magnesium or aluminum sulfate. Other effective accelerators include acids (e.g., phosphoric acid) or acid salts (e.g., ammonium acid phosphate).

TEST 1

A test is conducted to examine the properties of the aforementioned set modifying admixtures when added to a cement-free refractory castable. The composition of the refractory castable used is as follows:

| Material | Size U.S. Tyler Mesh | % Weight |
| --- | --- | --- |
| White Fused Alumina | −3 to −14 | 33.75% |
| High Purity (99%) MgO | −3 to −48 | 33.75% |
| (98%) MgO | −200 | 12.50% |
| Tabular Alumina | −325 | 3.50% |
| Reactive Calcined Alumina |  | 12.50% |
| Hydratable Alumina |  | 4.00% |
| TOTAL |  | 100.00% |
| Add: |  |  |
| Organic Fibers |  | 0.15% |
| Sodium Polyacrylate |  | 0.06% |
| Citric Acid |  | 0.10% |

Various materials are tested with the foregoing refractory material. The amount of set modifying admixture added to each refractory was about 38 ml to a 20-pound (9.07 kg) batch of refractory castable. In weight percent, the addition varied (depending upon the solution specific gravity) from 0.5% to 0.67%. The results of the test show that the foregoing refractory material is strongly accelerated by solutions of magnesium salts ($MgCl_2 * 6H_2O$ and $MgSO_4$). Aluminum sulfate was also effective. Most of the solutions used are 50% in water, although $MgSO_4$, that appears to gel at 50% concentration, is also tried and found to be effective in a 33% solution. Phosphoric acid (as received as 80% $H_3PO_4$ solution) is found to be extremely strong in its accelerating effect and produces a quick hardening. The hardening of the refractory was so quick, that a much more dilute solution of phosphoric acid is preferable.

The admixture solutions range widely in pH values, from very acidic (i.e., less than 2) for phosphoric acid to mildly basic (about 8) from magnesium sulfate. In view of the foregoing, it is believed that more than one mechanism of flow reduction influences the properties of the refractory castable. In this respect, gellation and/or setting of the activated alumina cement phase is expected to be accelerated by the presence of ions of magnesium and generally a more alkaline pH. On the other hand, acids will be expected to react with the magnesium oxide in the mix.

The level of admixture is expected to fall within the range of 0.2% to 0.9%, and more particularly, 0.3%–0.5% addition by weight of the castable.

TEST 2

A second test is conducted to compare the physical properties of a wet-sprayed cement-free refractory against a comparable cast-vibrated refractory material. The composition of the respective materials is set forth as follows.

| Material | Size (Tyler Mesh) | Cast-vibrated Refractory % wt. | Wet-sprayed Refractory % wt. |
|---|---|---|---|
| White Fused Alumina | 3 × 6 | 27.5% | 7.5% |
| White Fused Alumina | −6 | 40.0 | 55.0% |
| Tabular Alumina | −325 | 3.5% | 8.5% |
| MgO (98%) | −200 | 12.5% | 12.5% |
| Reactive Calcined Alumina |  | 12.5% | 12.5% |
| Calcium Aluminate Cement |  | — | — |
| Hydratable Alumina |  | 4.0% | 4.0% |
| Sodium Polyacrylate |  | 0.06% | 0.06% |
| Citric Acid |  | 0.1% | 0.1% |
| Organic Fibers |  | 0.2% | 0.15% |
| TOTAL |  | 100.36% | 100.31% |

Both refractories are cement-free, alumina ($Al_2O_3$)/magnesium oxide (MgO) refractories. Both refractories contain the same combined percent by weight of white fused alumina and tabular alumina. In this respect, both refractory materials contain 61% by weight of white fused alumina and tabular alumina. The particle sizes and the proportions of these materials, however, is different. In the wet-sprayed refractory, larger amounts of smaller particles are used to facilitate wet-spraying of the material (i.e., producing a pumpable material of suitable consistency) and to reduce "rebounding" of the sprayed material from the surface to be lined. In addition, the wet-sprayed refractory included slightly more organic fibers to facilitate the more rapid setting and curing of the refractory as a result of the set-modifying admixture added to the wet-sprayed refractory to prevent slumping and sagging.

The cast-vibrated refractory is mixed with water, and then poured and vibrated in accordance with conventional techniques. The wet-sprayed refractory is mixed with about 6.0% water and is wet-sprayed using a conventional swing-valve pump. An aluminum sulfate ($Al_2(SO_4)_3$) solution is added to the hydrated mixture just prior to spraying as a set-modifying admixture. The solution is comprised by weight of 2 parts water to 1 part aluminum sulfate. The aluminum sulfate ($Al_2(SO_4)_3$) solution is added to the refractory at a rate of about 0.6 gallons per ton of castable, that equates to about 0.3% by weight of the refractory material. The aluminum sulfate ($Al_2(SO_4)_3$) solution is effective in preventing slumping and sagging of the refractory applied by wet-process shotcreting.

The properties of the respective materials as cast-vibrated and wet-sprayed are set forth as follows:

|  | Cast-vibrated Refractory | Wet-sprayed Refractory |
|---|---|---|
| Modulus of Rupture (MOR), psi dried to 350° F. | 1700 | 1300 |
| Hot MOR, psi at 2700° F. | 1100 | 750 |
| Porosity, % after 2700° F. | 21.5 | 26.5 |
| Density, g/cm$^3$ after 2700° F. | 2.96 | 2.72 |

The results show that the wet-sprayed, cement-free refractory provides a material having physical properties suitable for application in corrosive environments.

A test is conducted to determine the actual effect that ladle slag has on the respective refractories. The test is conducted by exposing samples of the respective refractories to induction furnace slag. The furnace slag has the following general composition by weight:

CaO 35.0%
$Fe_2O_3$ 25.3%
$Al_2O_3$ 14.8%
MnO 10.1%
$SiO_2$ 9.9%
MgO 4.8%

Test samples of about 9"×3"×2" are exposed to slag at 2900° F. for six hours in the wall of an induction furnace. The effect of the slag on the samples is as follows:

|  | Cast-vibrated Refractory | Wet-sprayed Refractory |
|---|---|---|
| Area eroded, Inches$^2$ | 0.14 | 0.24 |
| Area penetrated, Inches$^2$ | 0.59 | 0.54 |
| Total slag affected, Inches$^2$ | 0.73 | 0.78 |

As seen from the foregoing results, the wet-sprayed, cement-free refractory is comparable to the cast-vibrated, cement-free refractory in resisting corrosive slag. The excellent corrosion resistance of the cement-free cement is thus attainable using a wet-mix shotcreting process.

The present invention has been described with respect to a method of wet-process spraying cement-free castables. Modifications and alterations will become apparent to those skilled in the art after reading the specification. It is intended that all such modifications and alterations be included insofar as they come within the scope of the invention as claimed, or the equivalents thereof.

Having described the invention, the following is claimed:

1. A method of applying a cement-free refractory castable to the surface of a refractory structure, comprising the steps of:
    a) preparing an intimately mixed refractory castable having alumina aggregate and a cement-free binder comprised of hydratable alumina;
    b) conveying the refractory castable under pressure through a delivery hose to a dispensing nozzle for applying said refractory castable;
    c) adding a chemical solution, wherein said solution is comprised of water and a chemical selected from the group consisting of acid salts soluble magnesium, and aluminum salts to the refractory castable prior to application by the nozzle at a rate wherein said solution comprises about 0.2% to 0.9% by weight of the refractory castable applied by the dispensing nozzle; and,
    d) spraying the alumina aggregate hydratable alumina, and chemical solution onto a surface.

2. A method as defined in claim 1, wherein said acid is phosphoric acid.

3. A method as defined in claim 1, wherein said acid salt is ammonium acid phosphate.

4. A method of applying a refractory castable to the surface of a structure, comprising the steps of:
    thoroughly mixing a cement-free refractory material comprised primarily of alumina aggregate, thermally reactive calcined alumina and a hydratable alumina binder;
    conveying the refractory material under pressure through a delivery hose to a dispensing nozzle for applying the refractory material;

adding a salt or acid solution to the refractory material prior to application by the nozzle at a rate wherein said salt or acid solution comprises less than about 0.90% by weight of the refractory material applied by the dispensing nozzle, the refractory having slag corrosion resistance comparable to a castable of similar composition; and spraying the alumina aggregate, thermally reactive calcined alumina, hydratable alumina, and acid or salt solution onto a surface.

5. A method as defined in claim 4, wherein said salt solution is aluminum salt.

6. A method as defined in claim 4, wherein said salt solution is an acid salt.

7. A method of applying a refractory castable to the surface of a structure, comprising the steps of:

thoroughly mixing a cement-free and silica-free refractory material comprised primarily of alumina aggregate, thermally reactive calcined alumina and a hydratable alumina binder and magnesia;

conveying the refractory material under pressure through a delivery hose to a dispensing nozzle for applying the refractory material;

adding a soluble magnesium salt solution to the refractory material prior to application by the nozzle at a rate wherein said soluble magnesium salt solution comprises less than about 0.90% by weight of the refractory material applied by the dispensing nozzle; and spraying the alumina aggregate, thermally reactive calcined alumina, hydratable alumina, magnesia, and salt solution onto a surface.

8. A method of applying a refractory castable to the surface of a structure, comprising the steps of:

thoroughly mixing a cement-free refractory material comprised primarily of alumina aggregate, thermally reactive calcined alumina and a hydratable alumina binder and magnesia;

conveying the refractory material under pressure through a delivery hose to a dispensing nozzle for applying the refractory material;

adding a phosphoric acid solution to the refractory material prior to application by the nozzle at a rate wherein said phosphoric acid solution comprises less than about 0.70% by weight of the refractory material applied by the dispensing nozzle; and spraying the alumina aggregata, thermally reactive calcined alumina, hydratable alumina, magnesia, and acid solution onto a surface.

\* \* \* \* \*